Patented Dec. 29, 1931

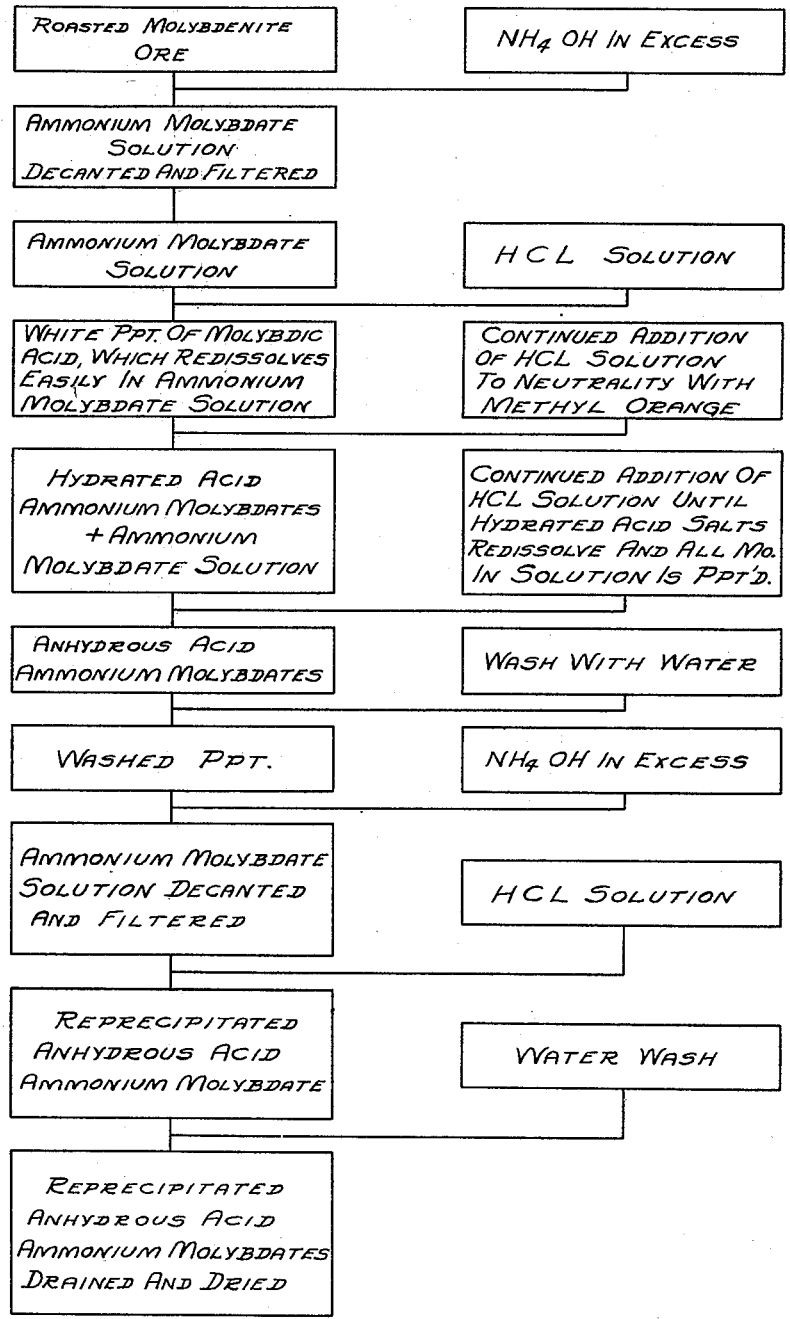

1,838,767

UNITED STATES PATENT OFFICE

CHARLES VERNON IREDELL, OF EAST ORANGE, NEW JERSEY, ASSIGNOR TO WESTINGHOUSE LAMP COMPANY, A CORPORATION OF PENNSYLVANIA

RECOVERY OF MOLYBDENUM

Application filed May 2, 1930. Serial No. 449,103.

This invention relates to the recovery of metals from their ores, and more particularly to the recovery of molybdenum from molybdenum containing ores.

One of the objects of this invention is to provide a method of extracting molybdenum from molybdenum containing ores and of recovering the molybdenum therefrom in a substantially pure condition.

Another object of this invention is to provide a simple efficient recovery process for the separating of molybdenum from molybdenum containng ores.

Another object is to provide a method of effecting the complete separation of molybdenum from ammoniacal solutions in an anhydrous crystalline form.

These and other objects and advantages will become apparent as the invention is more fully disclosed.

In accordance with the objects of my invention I have found that molybdenum may be separated from ammoniacal solutions as an anhydrous acid ammonium molybdate under certain conditons of solution acidity and ammonium chloride concentration which separation is substantially completely quantitative and substantially free from occluded or accompanying solution impurities, all as will be more fully hereinafter disclosed.

Heretofore in the art it has been customary to recover molybdenum from molybdenum containng materials by, first converting the molybdenum content of the material, which is usually present in the form of sulphide ($MoS_2$), to molybdenum oxide in any convenient manner such as by roasting. The molybdenum oxide is then separated therefrom either by sublimation or by solution in ammonium hydroxide ($NH_4OH$).

The first method is highly undesirable from a manufacturing production standpoint because of the elaborate equipment required and because the recovered oxide usually contains associated impurities which must subsequently be separated by wet recovery methods.

The second method is preferable and the present invention relates to a method of effecting the separation of the molybdenum from this ammoniacal solution. Heretofore it has been customary to recover the molybdenum from this solution as crystalline ammonium molybdate, obtained by evaporating the ammoniacal solution to crystallization and purifying the same through several recrystallizations. Owing to the relatively high solubility of the ammonium molybdate the losses are rather high. It is also found that alkali compounds are carried through in relatively large amounts. It has also been proposed heretofore to effect the separation of molybdenum from the ammoniacal solution as a hydrated acid ammonium molybdate compound or as molybdic acid by the addition of acid thereto. These compounds are either incompletely precipitated or are relatively highly soluble in the wash waters and losses in recovery therefore are experienced.

By the practice of the present invention I effect the separation of the molybdenum as a white crystalline anhydrous acid ammonium molybdate by regulating the acidity of the solution to contain between .01 to 0.5% acid, using methyl orange as an indicator, and at the same time providing that the solution contain a relatively high concentration of ammonium chloride ($NH_4Cl$). The actual empirical formula for the precipitated salt appears to depend upon the concentration of the ammonium chloride present in the solution during the precipitation operation. I have obtained the following types of salts by this method of precipitation:

(1) $4(NH_4)_2O.13MoO_3$
(2) $(NH_4)_2O.4MoO_3$
(3) $4(NH_4)_2O.19MoO_3$

Subsequent to precipitation the anhydrous salt may be washed repeatedly with water or with acid ammonium chloride solution without substantial loss by solution therein. Moreover, the salt being crystalline in character, settles quickly and may be readily separated and washed by standard filtration methods.

As a specific embodiment of the practice of the present invention an amount of roasted ore equivalent to 1500 gms. of $MoO_3$, (e. g. 18,875 gms. of ore containing 79.5% of $MoO_3$)

is agitated with a mixture of 19.5 liters of water and 19.5 liters of concentrated aqua ammonia for one half hour. The residue is then allowed to settle and the clear ammonium molybdate solution decanted off and filtered. The residue is leached with 15 liters of water and this solution is decanted, filtered and added to the original solution. The combined solution has a specific gravity of 1.190. Strong hydrochloric acid of specific gravity 1.175–1.185 is now run in, in the form of a fine jet, at the same time agitating the solution vigorously. The molybdic acid which forms must be completely redissolved.

As the reaction proceeds, the heavy green tinted hydrated molybdate precipitates out and this continues until the solution is neutral with respect to methyl orange. The addition of acid is continued until no further precipitate is formed, at the same time agitating vigorously.

The agitation during this latter period is particularly important as it is during this part of the operation that all of the soluble hydrated molybdates are converted to the much less soluble anhydrous acid molybdates. Under the conditions given here, the salt $4(NH_4)_2O.19MoO_3$ is formed. The precipitation is completed when an acidity of about .01 to 0.5% with respect to methyl orange has been reached. The entire precipitating operation takes about one hour with one acid jet. The white salt is washed four times by decantation with 35 liter washes of ammonium chloride solution (200 gms. per liter, acidity = 0.4%). This may be followed by a water wash to remove the ammonium chloride or the salt may be drained directly on a vacuum filter, dried in air or at 100° C. It is to be noted in the above specific embodiment that the original ammoniacal solution contains sufficient excess of ammonia, such that on neutralization with hydrochloric acid, ammonium chloride is formed in amounts sufficient for the purpose of my invention. This amount preferably should be approximately 200 grams ammonium chloride per liter of solution.

The air dried precipitate thus obtained is of reasonably high purity for most purposes, but in the presence of ferrous iron it will be found that appreciable quantities of iron will be present therein as occluded impurities. I prefer, therefore, to effect a reprecipitation of the anhydrous acid ammonium molybdate, and to effect this the air dried precipitate is redissolved in ammonium hydroxide solution, using a large excess of ammonia. The solution is filtered to remove the iron and other insoluble material, and the ammonium molybdate solution acidified with hydrochloric acid in the manner as before set forth, to effect the reprecipitation of the anhydrous molybdate salt. The salt is washed with slightly acid water or with acid ammonium chloride solution, collected and air dried as above noted.

The reprecipitated anhydrous ammonium molybdate thus prepared is singularly free from deleterious impurities and is useful in the preparation of molybdenum metal powder by the reduction of this anhydrous acid molybdate compound with hydrogen, in accordance with prior art methods. The advantages obtained by its use is in the high degree of purity and freedom from deleterious adsorbed and absorbed salts, of the present product and in the relatively uniform particle size of the molybdate salt, which particle size is reflected in the metal powder product.

To facilitate the understanding of the present invention reference should be made to the accompanying drawing which graphically sets forth the flow sheet diagram of the steps of the process, as is given in the above specific embodiment.

Having broadly and specifically set forth the present invention it is apparent that there may be many departures made from the specific embodiment as set forth herein, but such variations and departures are anticipated as may fall within the scope of the following claims:

What is claimed is:

1. As an article of manufacture, anhydrous acid ammonium molybdate.

2. As an article of manufacture, an anhydrous acid ammonium molybdate having the empirical formula 1 to $4(NH_4)_2$ 0.13 to 19 $(MoO_3)$.

3. The method of separating molybdenum from ammoniacal solutions which comprises precipitating an acid molybdate compound therefrom by adjusting the solution to an acidity approximating .01 to .5 per cent using methyl orange as an indicator and adding thereto ammonium chloride.

4. The method of separating molybdenum from ammoniacal solutions which comprises precipitating an acid molybdate compound therefrom by reducing the acidity of the solution to about 0.01 to 0.5 per cent, using methyl orange as an indicator, maintaining in said solution at the same time a concentration of ammonium chloride of about 200 grams per liter.

5. The method of separating molybdenum from ammoniacal solutions which comprises precipitating an acid molybdate compound from an acid solution having an acidity between 0.01 to .5 per cent, using methyl orange as an indicator, and an ammonium chloride concentration approximating 200 grams per liter.

6. The method of preparing substantially pure molybdenum salts from molybdenum containing materials which comprises converting the molybdenum content of the material to a compound readily soluble in ammonium hydroxide solution, separating said solution, acidifying said solution to about 0.01 to .5 per cent acidity using methyl orange as an indicator, at the same time adjusting the ammonium chloride concentration thereof to about 200 grams per liter and collecting the precipitate.

7. The method of preparing substantially pure acid molybdenum compounds from molybdenum ores which comprises oxidizing the molybdenum content of said ores, extracting the molybdenum oxide with ammonium hydroxide solution, separating the extract solution, acidifying the solution to between 0.01 to .5 per cent acid, using methyl orange as an indicator, at the same time adjusting the ammonium chloride concentration of the solution to about 200 grams per liter, collecting the precipitate, washing with acid ammonium chloride solution, and drying the washed precipitate.

8. The method of preparing substantially pure acid molybdenum compounds from molybdenum ores which comprises oxidizing the molybdenum content of said ores, extracting the molybdenum oxide with ammonium hydroxide solution, separating the extract solution, acidifying the solution to between 0.01 to .5 per cent, using methyl orange as an indicator, at the same time adjusting the ammonium chloride concentration of the solution to about 200 grams per liter, collecting the precipitate, redissolving the precipitate in ammonium hydroxide solution, filtering the solution, reprecipitating the molybdenum content thereof as before, collecting and drying the precipitate.

In testimony whereof, I have hereunto subscribed my name this 18th day of April, 1930.

CHARLES VERNON IREDELL.